Feb. 21, 1928.
J. F. RALEIGH
1,659,702
THEFT PREVENTING DEVICE
Filed Dec. 22, 1926
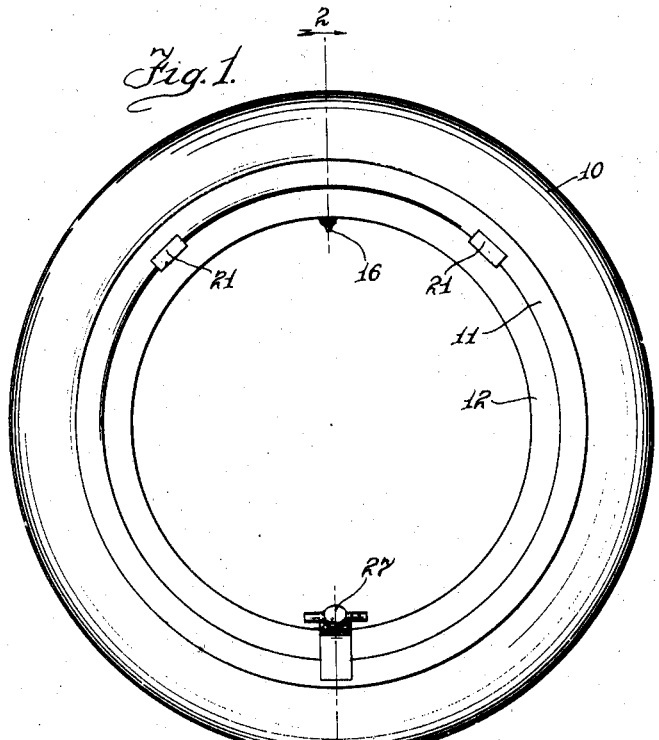
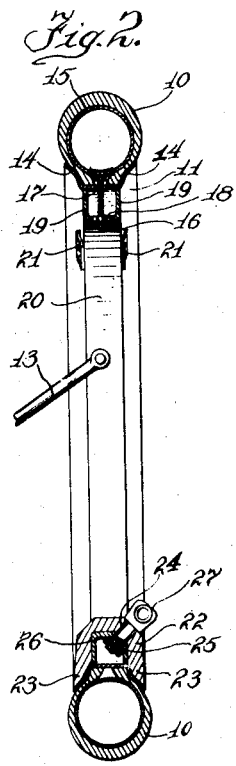
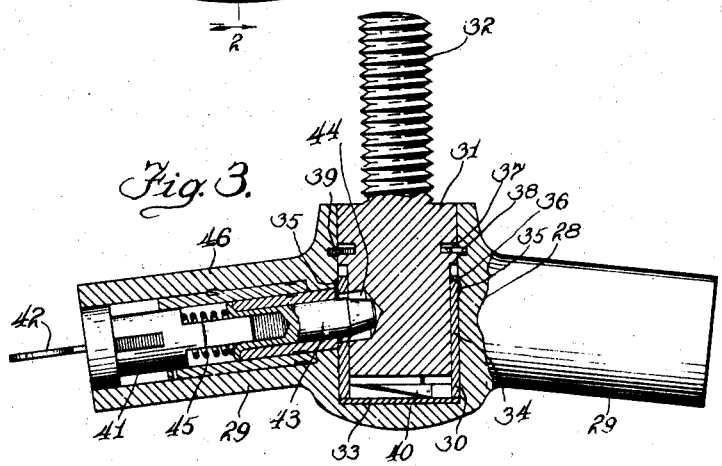
Inventor
James F. Raleigh
By Williams, Bradbury,
McCaleb & Hinkle
Attorneys.

Patented Feb. 21, 1928.

1,659,702

UNITED STATES PATENT OFFICE.

JAMES F. RALEIGH, OF CHICAGO, ILLINOIS, ASSIGNOR TO PINES WINTERFRONT COMPANY, OF CHICAGO, ILLINOIS, A CORPORATION OF DELAWARE.

THEFT-PREVENTING DEVICE.

Application filed December 22, 1926. Serial No. 156,328.

My invention relates to theft preventing devices which, by their application to clamping means upon a spare tire carrier, are adapted to prevent the unauthorized removal of the spare tire from the carrier.

The device of my present invention comprises a bolt or cap-screw which, when in use, is so related to its associated lock-housing, and to the carrier and its retainer, that all parts of the cap-screw are effectively protected against tampering. The lock-housing is rotatable on the cap-screw when the spare tire and rim or the rim alone is locked to the carrier, the said lock-housing being adapted to be locked to the cap-screw, as the activating element therefor, when the said cap-screw is to be unscrewed from or applied to the carrier.

Other features, objects and advantages of my invention will appear more fully from the following detailed description and from the accompanying drawings, in which Figure 1 is an elevational view of a carrier with which my improved theft preventing device is associated;

Figure 2 is an elevational view, in cross section, taken on the lines 2—2 of Figure 1; and Figure 3 is a detailed view of my improved theft preventing device in partial cross section.

Similar characters of reference refer to similar parts throughout the several views.

Referring to Figures 1 and 2, 10 indicates a spare tire casing mounted upon a demountable rim 11 in the usual manner, and 12 indicates a carrier which may be supported upon an automobile at any point desired by a plurality of brackets 13, or other convenient supporting means.

The rim 11 has the usual flanges 14, which are curved outwardly to retain and protect the tire casing 10.

The casing 10 contains the usual inner tube 15, having a valve 16 passing through an aperture 17 in the rim 11, and the carrier 12 is provided with a similar aperture 18 which may be aligned with the aperture 17 to permit the passage of the valve 16.

The carrier 12 is preferably an annulus of substantially U cross section, as shown, with its open side outward, and comprises a substantially cylindrical portion 20 having at each end a right angled annular flange 19, the exterior edges of the flanges 19 being circular and fitting the interior surface of the spare rim 11.

In order to retain the rim 11 upon the annulus 12, the said annulus is provided with a plurality of lugs 21 upon each side of its upper edge, adjacent the valve aperture. While a single lug may be sufficient upon each side of the annulus 20, I prefer to provide a pair of spaced lugs 21 upon each side of the valve 16 and upon both sides of the annulus 12, thereby providing, with the shoe 22 further to be described, a three point support upon each side of the rim 11.

The annulus 12 is provided at a point diametrically opposite the valve stem with a cast metal shoe 22, comprising a substantially U shaped metal member, preferably of steel, which is adapted to fit about the annulus 12 and to extend outward beyond the flanges 19 of the spare rim, and, in order to hold the spare rim without rattling upon the annulus 12, the projecting shoulders 23 of the shoe 22 may be made to fit the curve of the flanges 14.

In order to lock the shoe 22 in position upon the annulus 12, the shoe 22 is provided with an aperture 24 which may be aligned with an aperture 25 in the annulus, and the annulus is provided upon its interior with a threaded member 26 having a threaded aperture aligned with the apertures 24 and 25. The member 26 may be fixedly secured in the annulus 12 by welding or any other permanent fastening means.

I prefer to incline the apertures 24 and 25 outwardly and upwardly toward the rear of the carrier to facilitate the application of the locking device.

The locking device 27 comprises a housing 28 which has handle portions 29. The housing 28 is provided with a bore 30 which is adapted to receive the head 31 of a threaded bolt 32 and permit the head 31 to rotate in said housing. In order to prevent unauthorized access to the lock by means of piercing instruments driven through the housing 28 into the head 31, I may provide the bore 30 with a lining comprising a circular piece of armor plate 33 secured in the base of the bore 30 by a close fit; and an armored sleeve 34 having an aperture 35, the sleeve 34 being secured in the bore 30 by means of the annular milled area 35 which is adapted to bite into the relatively softer metal of the housing 28 when the sleeve 34 is inserted.

The head 31 comprises a substantially cylindrical member having a turned down portion 36 to fit the sleeve 34, and the head 31 and the bore 30 are provided with registering annular grooves 37 and 38, respectively, the groove 37 in the head being of sufficient depth and size to completely receive a split steel ring 39 for a purpose further to be explained. In order to rotatably support the head 31 in the housing 28 without rattling, and to somewhat brake the relative rotative movement, I provide a compression spring 40 which may be a single convolution of a helical steel spring, and in assembling the head 31 and the housing 28, the spring 40 is placed within the sleeve 34 upon the armor plate 33. The split ring 39 is sprung down into the groove 37 and the head 31 is slid into the bore 30 and sleeve 34, the split ring sliding along the bore until the grooves 37 and 38 register, after which the split ring 39 springs out into the groove 38, which groove is of less depth than the ring 39, thereby retaining the said ring in shearing position across both grooves and retaining the head 31 in the housing 28. The spring 40 has been slightly compressed during this assembly, and thereby serves to press the head 31 outward, braking its rotative action and preventing rattling of the head within the bore 30.

In order to lock the head 31 to the housing 28 so that the bolt 32 may be threaded into any threaded socket, I provide a locking means comprising a tumbler barrel 41 which is adapted, by means of the key 42, to control the bolt 43 extending through the aperture 35 of the sleeve armor 34 into the aperture 44 in the head 31. The bolt 43 is resiliently pressed into the opening 44 by a spring 45, and the bolt may be removed from its locking position, as shown in Figure 3, by turning the key 42, which serves to withdraw the bolt 43 from the aperture 44 in the head 31, permitting the housing 28 to rotate freely upon the head 31.

The exact details of the tumbler barrel 41, bolt 43 and the associated structure in the hollow arm 46, is the same as that disclosed in my prior application, Serial No. 23,559, filed April 16, 1925, for theft preventing devices, and as the structure of this key actuated means may be varied, further description of the same is considered unnecessary. However, I prefer to use that type of tumbler barrel, in combination with the other elements in my theft preventing device, which will not permit removal of the key when the locking bolt is in the position shown in Figure 3, as this is the position in which the housing 28 can actuate the threaded bolt 32, so that the key 42 cannot be removed except by turning the key to the position in which the locking bolt 43 is retracted and the housing 28 is rotatable upon the head 31. Thus, the key cannot be removed unless my theft preventing device is in locking condition, and this is a very valuable feature in assuring the locking of the theft preventing device.

If the key 42 is turned to the position of Figure 3 at a time when the bolt 43 is not aligned with the aperture 44, the bolt 43 will ride upon the cylindrical surface of the head 31 until the aperture 44 is aligned with the bolt 43, whereupon the spring 45 will force the bolt 43 into its locking position as shown at Figure 3. It should be noted that when the bolt 43 is in locking position with the head 31, the theft preventing device is then in what may be termed unlocked condition as a whole, as the threaded bolt 32 may then be rotated by means of the housing 28 and removed from its clamping position, but when the bolt 43 is in unlocking position relative to the head 31, the theft preventing device is then in what may be termed locked condition, as the bolt 32 cannot be removed since the housing 28 will rotate freely on the head 31 and will not actuate the bolt 32.

In placing a spare rim and tire upon the carrier, for protection by the theft preventing device, the tire valve is first inserted through the opening 18 in the annulus 12, the rim 11 sliding down upon the annulus 12 between the lugs 21, after which the lower side of the rim 11 may be slid upon the lower portion of the annulus 12, and the shoe 22 placed over the annulus 12 with the shoulders 23 holding the rim 11 in place. The aperture 24 of the shoe 22 having been aligned with the threaded aperture 25 of the annulus 12, the threaded bolt 32 may be inserted and manually screwed into place by means of the housing 28, the bolt 43 being in the position shown in Figure 3. The bolt 32 having been screwed to such position that the shoe 22 is firmly clamped upon the annulus 12, the key 42 may be turned, withdrawing the bolt 43 from the head 31, after which the housing 28 will rotate upon said head and the bolt 32 cannot be withdrawn.

It will thus be observed that I have provided a simple and effective theft preventing device for locking a spare rim and tire upon a tire carrier, and that when the locking device 27 is in position, as shown in Figures 1 and 2, the bolt 32, being disposed within the annulus 12, is inaccessible for the application of tools of any kind.

While I have described in more or less detail the construction and mode of operation of my locking device as applied to a specific spare tire carrier, I desire it to be understood that other applications of my invention may be made, and I do not wish to be limited to the precise structure set forth. However, my theft preventing device is particularly effective when used with the carrier shown, constituting a particularly simple and cheap tire carrier and locking structure.

What I claim as new and desire to secure by Letters Patent of the United States is:

1. In combination with a spare tire carrier provided with a tapped opening for the reception of the screw locking device hereinafter mentioned, spare rim retaining means associated with a carrier, said retaining means having an aperture in the same for the reception of said screw, a theft preventing device comprising a cap screw extending through said aperture and engaging in said tapped opening, a housing rotatably receiving the head of said cap-screw, means for permitting the screw-head to rotate in said housing while preventing its withdrawal therefrom, and a key-operated bolt within the housing for locking the housing and cap-screw against relative rotation, said cap-screw, when in operative condition, being entirely enclosed by said housing carrier and retaining means aforesaid.

2. In a theft preventing device for spare rims and tires, a hollow annular supporting member adapted to receive a demountable rim, a plurality of shoulders on said member to prevent axial movement of said rim on said member, a substantially U shaped shoe on said member at a point diametrically opposite said shoulders, extending about said annular member and having its ends fitting against said rim on both sides, a threaded member extending through said shoe and threaded into said annular member, a housing on said threaded member, and key actuated means for releasing said threaded member from rotation by said housing.

3. A theft preventing device for spare rims and tires comprising a hollow annular rim supporting member adapted to be closed by placing a rim thereon, said member having a tapped aperture therein, a retaining member for preventing removal of said rim from said supporting member, said retaining member having an aperture therein, a cap-screw adapted to pass through said retaining member and to be threaded in said tapped aperture, a housing enclosing the head of said cap-screw and having the threaded portion of said cap-screw projecting therefrom, said housing being adapted to bear against said retaining member to press the same against said supporting member when said cap-screw is entirely enclosed by said housing, retaining member, and supporting member, means permitting rotation of the head of said cap-screw within said housing while preventing its withdrawal therefrom, and a key-operated bolt for locking said housing to said cap-screw to permit rotation of the latter by the former.

4. A theft preventing device comprising a body having a blind bore therein, a sleeve armor lining said bore, said sleeve armor comprising a hardened steel member having an aperture in its wall, a threaded bolt having its head encased by said bore and rotatably held against removal from said bore, said head having a recess adapted to register with the aperture in said armor, a locking bolt carried by said body, adapted to extend through said aperture and engage in said recess, spring means adapted to urge said locking bolt through said aperture and into said recess when the recess and aperture are in registry, and a lock mechanism carried by the body for retracting and holding said locking bolt out of said recess.

In witness whereof, I hereunto subscribe my name this 17 day of December, 1926.

JAMES F. RALEIGH.